United States Patent
Lai et al.

(10) Patent No.: US 7,253,749 B2
(45) Date of Patent: Aug. 7, 2007

(54) ENGLISH LETTER CODING METHOD AND A SMALL KEYPAD

(75) Inventors: Winhong Lai, Kowloon (CN); Wingfai Lai, Central (CN)

(73) Assignee: XuXu Ltd., Hong Kong Sar (CN)

( * ) Notice: Subject to any disclaimer, the term of this patent is extended or adjusted under 35 U.S.C. 154(b) by 326 days.

(21) Appl. No.: 10/481,247

(22) PCT Filed: Nov. 23, 2001

(86) PCT No.: PCT/CN01/01583

§ 371 (c)(1),
(2), (4) Date: Jun. 8, 2004

(87) PCT Pub. No.: WO02/003506

PCT Pub. Date: Dec. 27, 2002

(65) Prior Publication Data

US 2004/0239632 A1  Dec. 2, 2004

(30) Foreign Application Priority Data

Jun. 18, 2001  (CN) ............................... 01 1 04196

(51) Int. Cl.
*H03K 19/00* (2006.01)

(52) U.S. Cl. ........................................ 341/20; 341/22

(58) Field of Classification Search ................... 341/20
See application file for complete search history.

(56) References Cited

U.S. PATENT DOCUMENTS

| 3,657,476 A | * | 4/1972 | Aiken | ........................ 380/28 |
| 5,507,021 A | | 4/1996 | Siegle | ........................ 455/158 |
| 6,107,997 A | | 8/2000 | Ure | ............................ 345/173 |

* cited by examiner

*Primary Examiner*—Brian Zimmerman
*Assistant Examiner*—Hung Q Dang
(74) *Attorney, Agent, or Firm*—Jacobson Holman PLLC

(57) ABSTRACT

This invention relates to a kind of coding method and related miniature keyboard for western characters. The invention assigns a 3-digit number that has specific value to every western letter. The 3-digit number corresponding to a letter is the code of this letter, which is composed of three numbers, namely, 0, 1 and 2. The total of corresponding modes that correlates the three-digit code with letters of alphabet is the factorial of 26, which is $4 \times 10^{26}$. The data input keyboard that introduces this coding principle can be simplified as to a miniature keyboard that is consisted of only three input keys, which can be used as data input device for small portable electronic equipment and the like to replace traditional large keyboards. Besides, this coding method can be designed as a kind of tool for character games.

8 Claims, 8 Drawing Sheets

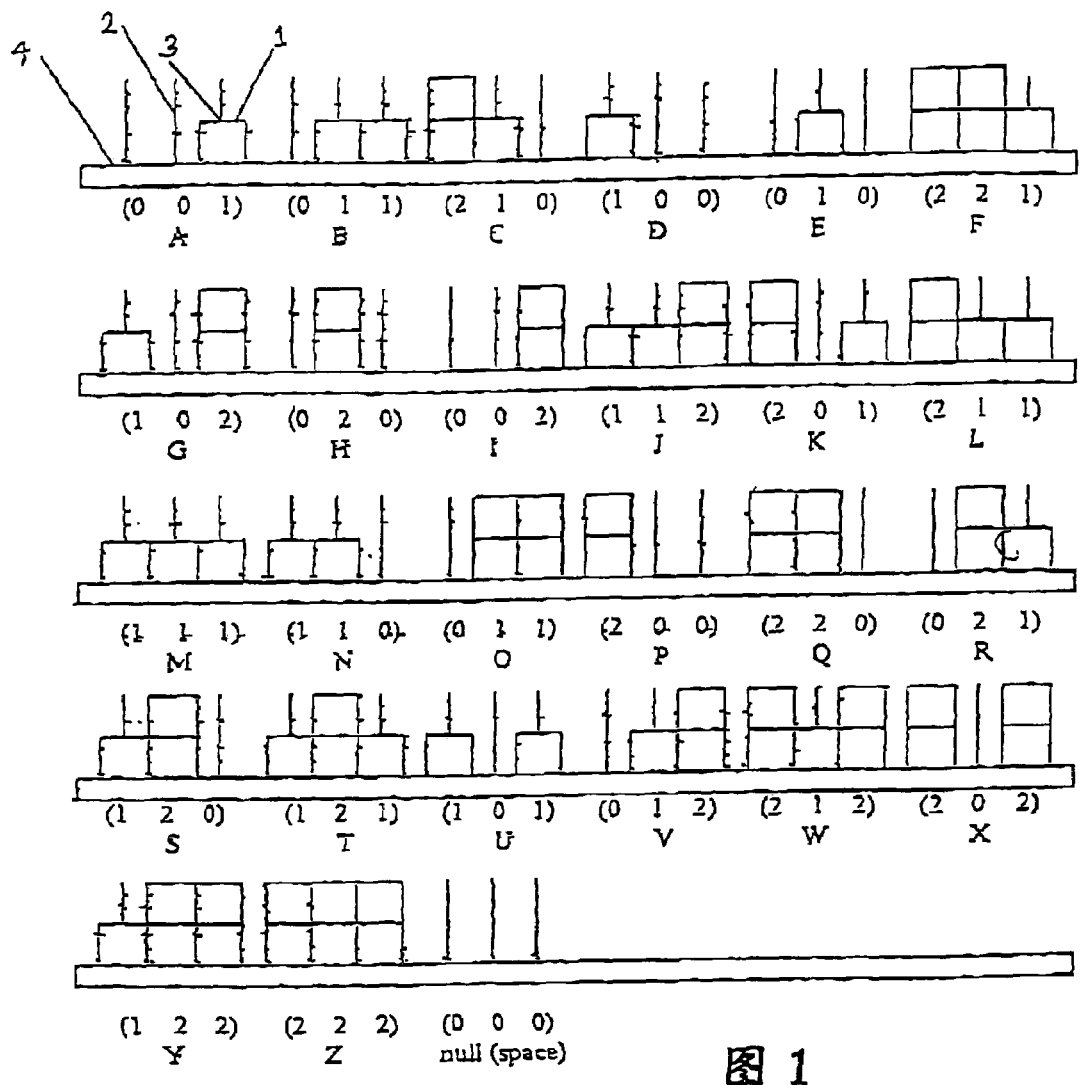
图 1
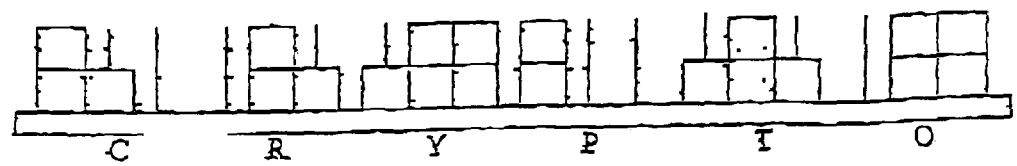
图 2

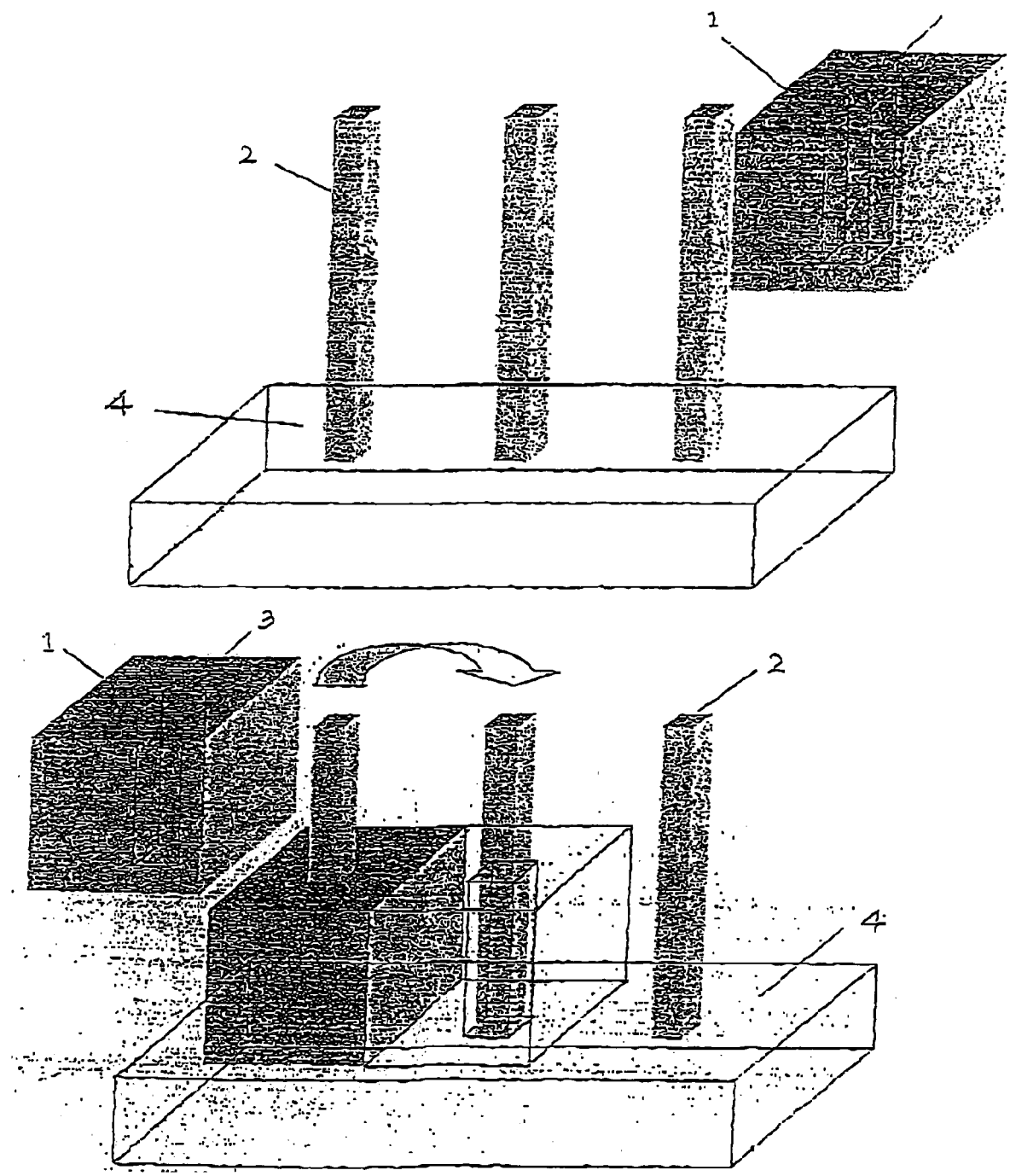
图 3

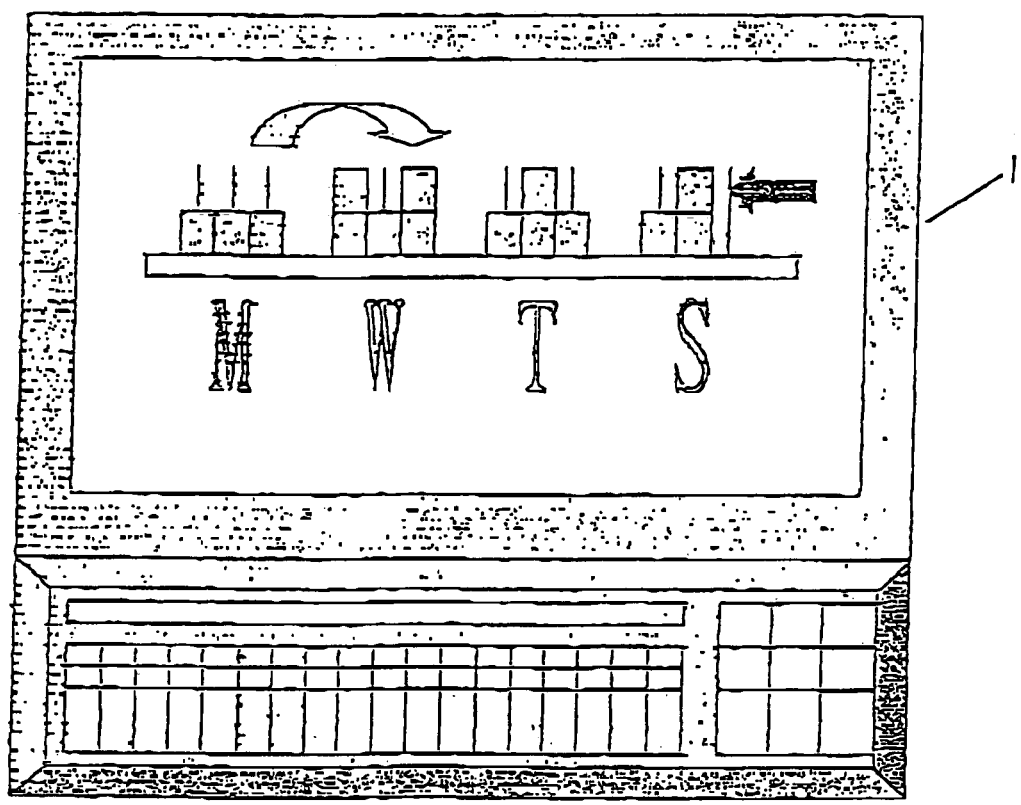
图 4

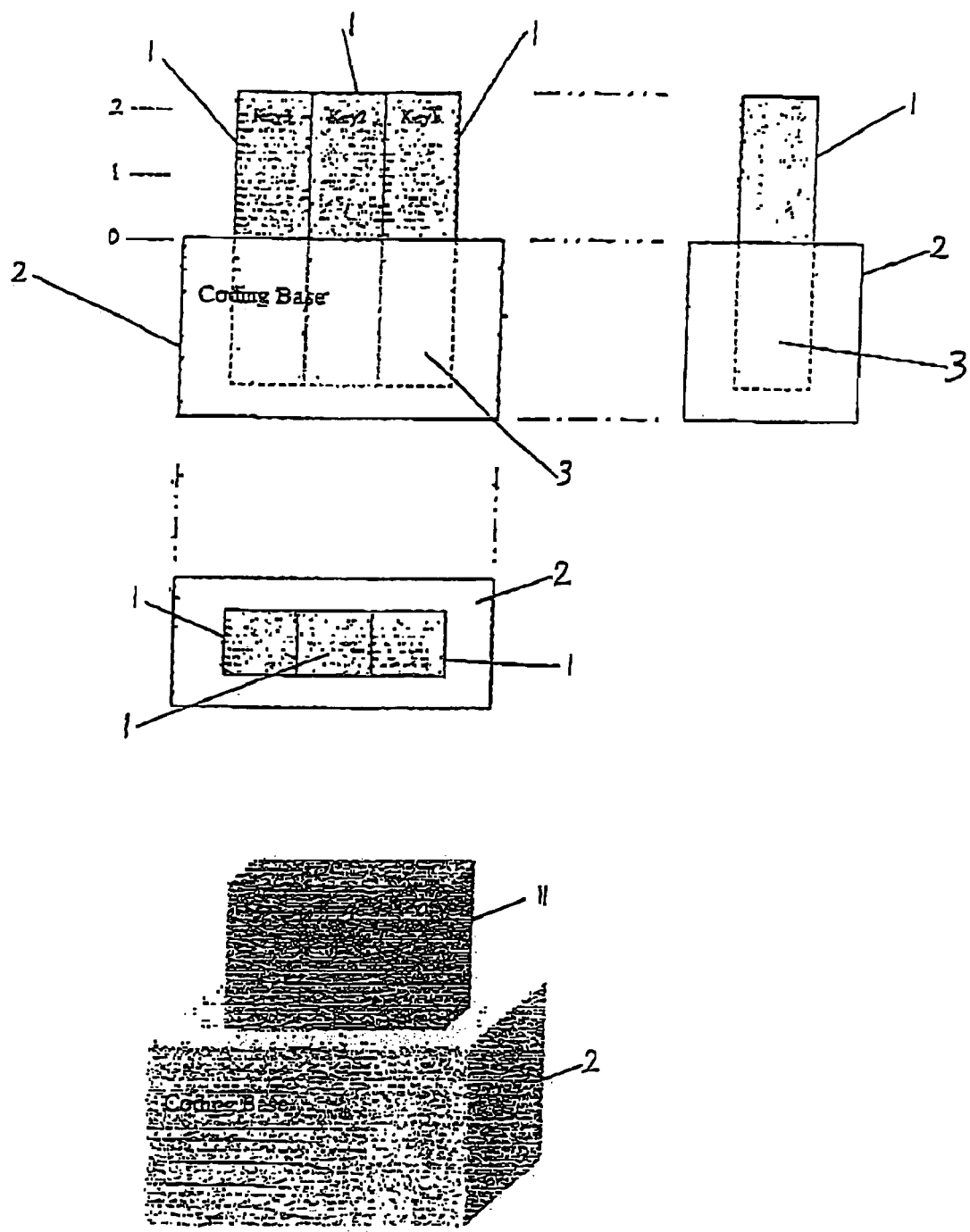
图 5

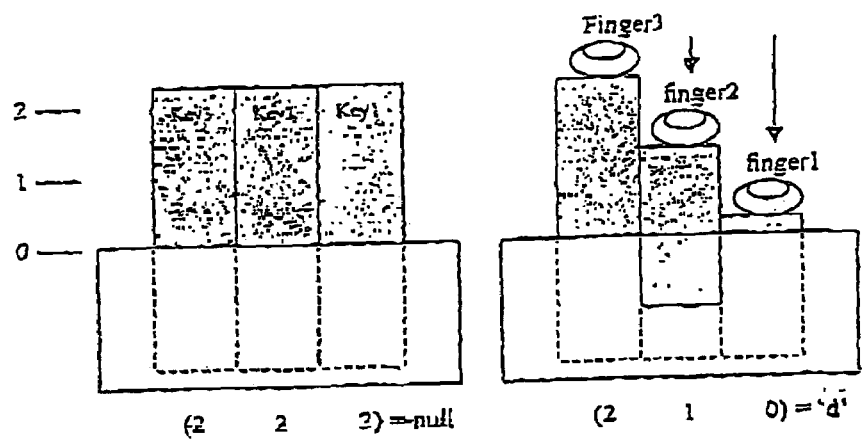
图 6
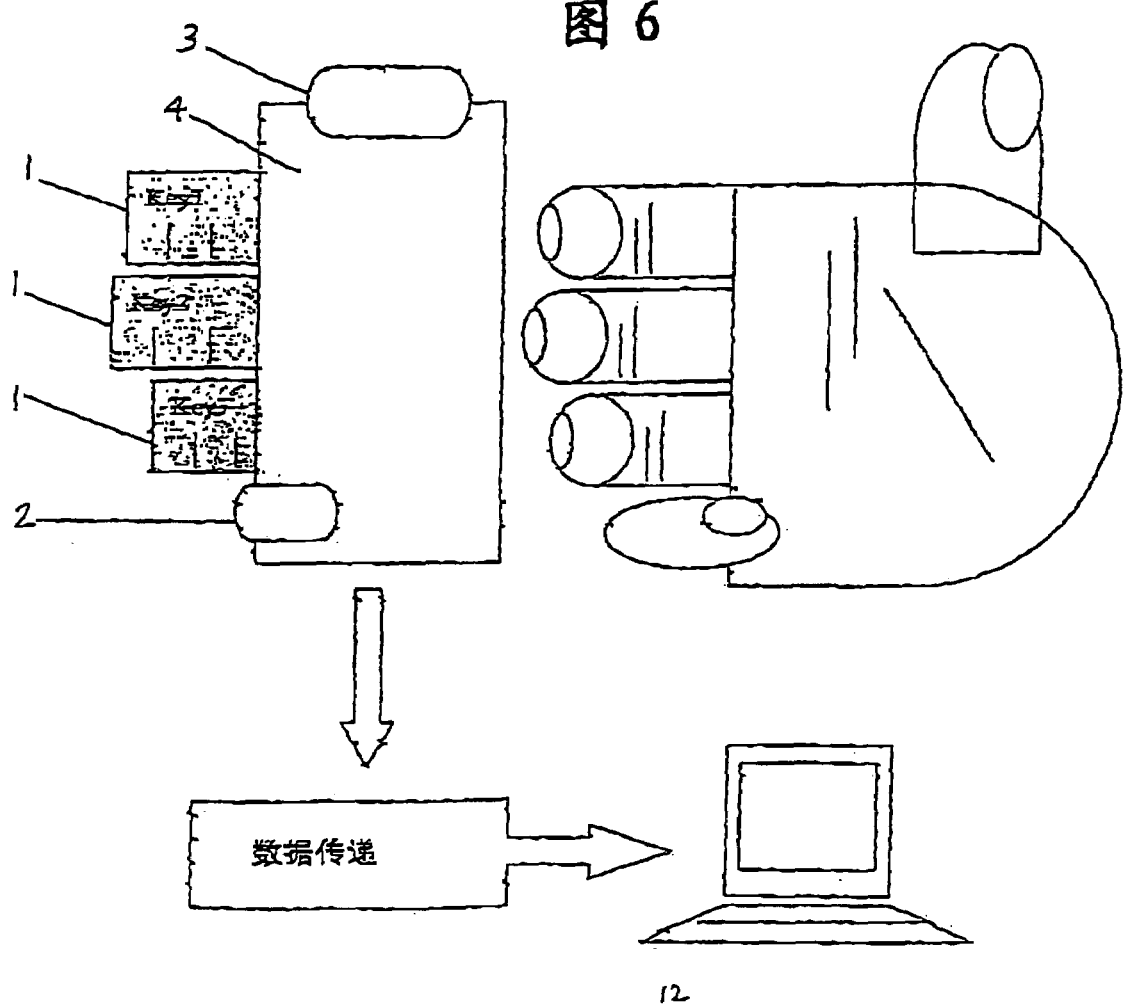
图 7

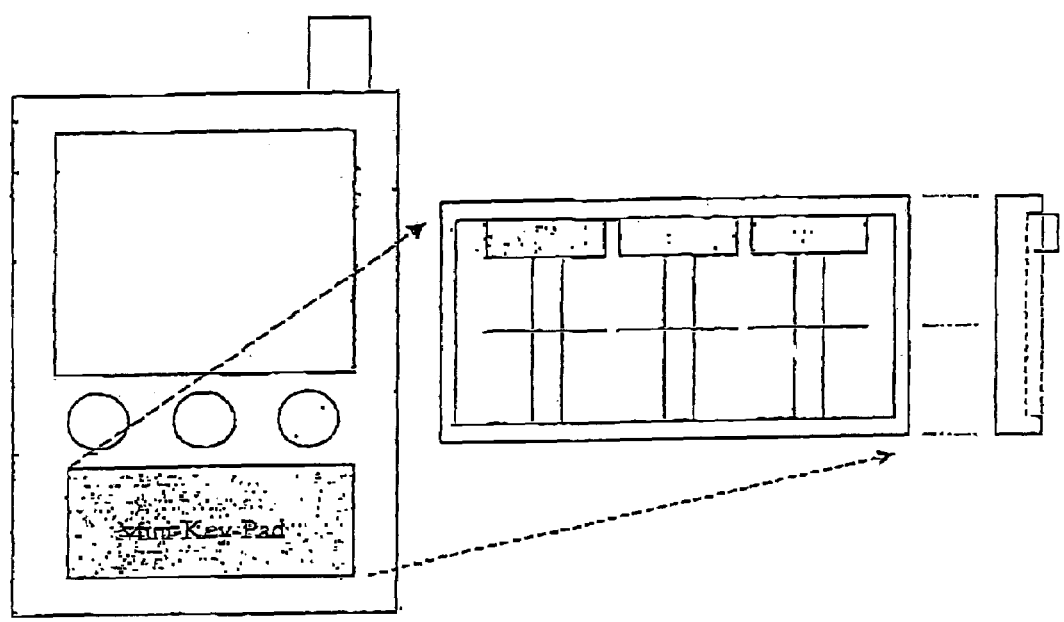
图 8

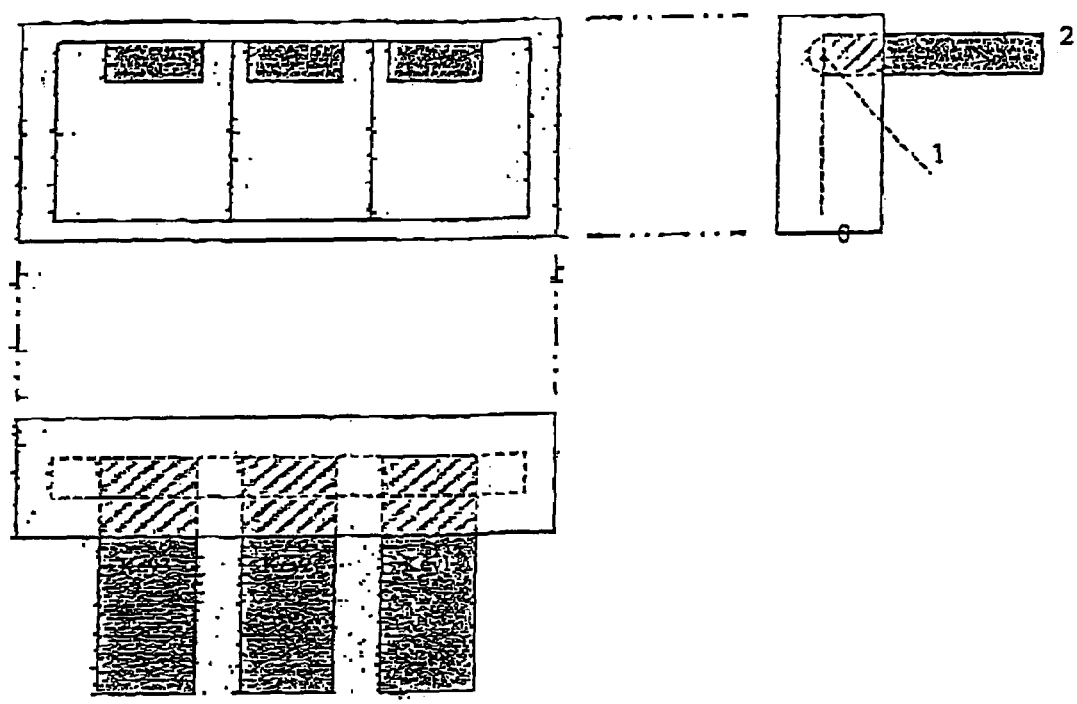
图 9

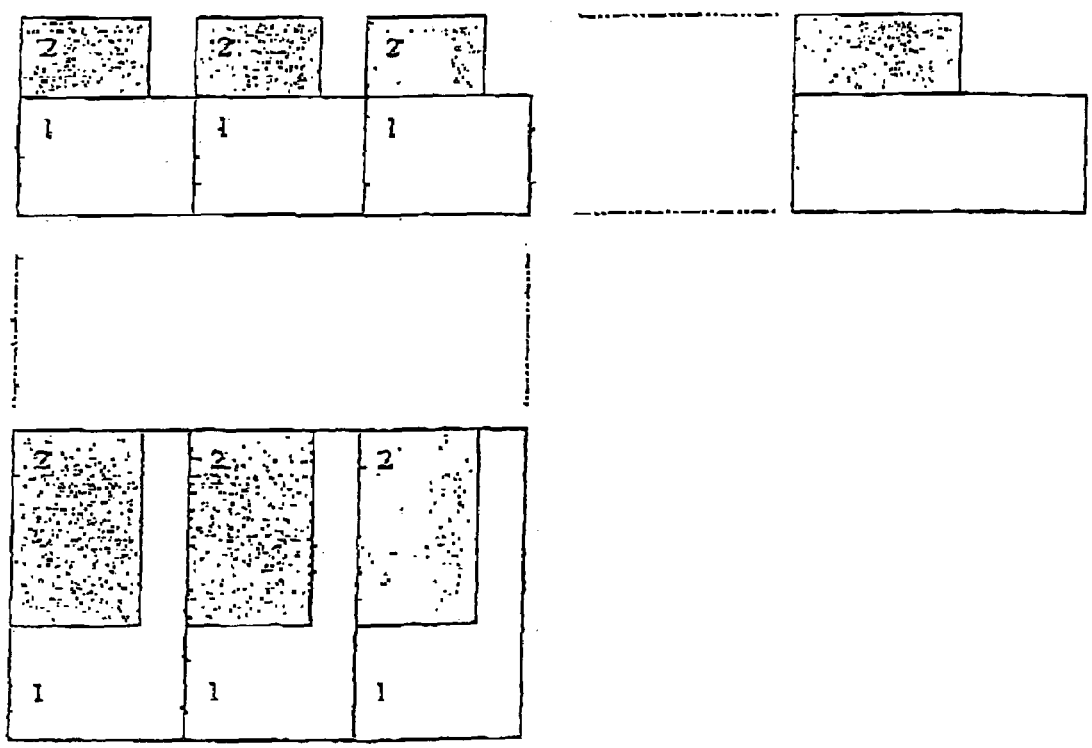
图 10

ENGLISH LETTER CODING METHOD AND A SMALL KEYPAD

FIELD OF THE INVENTION

The present invention relates to a kind of coding method and related miniature keyboard for western characters.

BACKGROUND ART

With the rapid development of electronic computers, more and more coding methods and data input keyboards come into being. Amongst the most commonly used are Pinyin (Chinese Phonetic-Alphabetic) Method, Five-Stroke Font Method, Zbeng Coding Method and the like, that are used to input Chinese characters. However, the tools these data inputting methods use can only be traditional keyboards, which, besides being clumsy in size and hence not easily carried, have various keys, for example, keys for 26 letters, numerical keys etc, that not only render blind typing difficult but also result in a low working efficiency.

SUMMARY OF THE INVENTION

In view of this, the present inventor, with his accomplishment in specialty and theory in technology, has made possible the creation of the present invention after trials and errors interwoven with breakthroughs and improvements.

The main object of this invention is to provide a coding method for the 26 letters per se, whereby it is realized that only three keys are needed to complete the input of English vocabulary.

A further object of this invention is to provide a handy character game device.

Yet another object of this invention is to provide a miniature keyboard with only three keys.

To achieve the objects mentioned above, the present invention is to be realized through the following technical solutions:

The western-character inputting method of the present invention is a solution for coding of the 26 letters per se, in other words, it assigns a 3-digit number that has specific value to every letter. The 3-digit number corresponding to each letter is composed of three numbers, namely, 0, 1 and 2. The mathematical principle of the invention is elucidated by the grid below on a step-by-step basis.

| 6 | 5 | 4 |
|---|---|---|
| 3 | 2 | 1 |

According to the 'gravity' principle, this kind of 2 multiplied by 3 of a grid can be visually regarded as three independent 'poles', on each of which 0, 1 or 2 'cubic block(s)' can be installed. When the three 'poles' having 'cubic block(s)' are combined together, the combination represents a code of a 3-digit number in mathematics, and each number of such a code may be in three available states {'0', '1', '2'}.

The most maximally possible amount of codes for the combination of these three 'columns' having 'cubic block(s)' may be $3 \times 3 \times 3 = 27$, which are specified as follows:
(000) (001) (002) (010) (011) (012) (020) (021) (022)
(100) (101) (102) (110) (111) (112) (120) (121) (122)
(200) (201) (202) (210) (211) (212) (220) (221) (222)

Zero code (000) is pre-reserved to represent null character or blank space. The other 26 codes may correspond seriatim to the 26 letters in the alphabet; e.g., (002) stands for the letter 'I'.

The total of corresponding modes for this 3-digit code specifically corresponds to a given letter in the alphabet, e.g., whether should (002) or (001) stand for the letter 'I', is the factorial of 26, which is $26 \times 25 \times \ldots \times 1 = 4 \times 10^{26}$. This astronomical number of the corresponding modes provides a feasible basis upon which users are entitled to set their individual encryption solutions.

A certain mode can be drawn from the $4 \times 10^{26}$ corresponding modes as a standard of default, whereupon the codes are converted into some visible forms resembling, e.g., the letters in the alphabet. Such visible forms are extremely useful in the actual application.

For Example:

(000) = □ = space    (001) = □ = a
(002) = □ = i        (010) = □ = e
(011) = □ = b        (012) = □ = v
(020) = □ = h        (021) = □ = r
(022) = □ = o        (100) = □ = d
(101) = □ = u        (102) = □ = g
(110) = □ = n        (111) = □ = m
(112) = □ = j        (120) = □ = s
(121) = □ = t        (122) = □ = y
(200) = □ = p        (201) = □ = k
(202) = □ = x        (210) = □ = c
(211) = □ = l        (212) = □ = w -continued

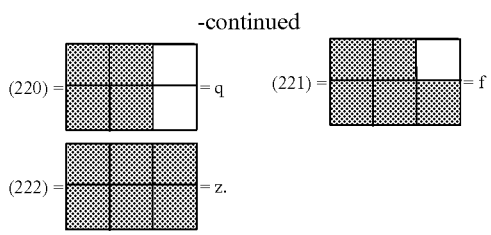

Specific applications below are based on the above coding method.

1). Games of riddles: Character games are received with worldwide enthusiasm, and patent rights have already been bestowed to some of them. This invention can also be used to create special character games that are simple and challenging enough to be tool kits for household entertainment. The feature that every letter has a corresponding code ('Crypto-Grid') provides a possibility to the reversion of letters. The game can also be a tool which makes it easier for kids and their parents to learn the theory of 'en-/decrypt'. The game can be designed to be played physically and electronically. Such games of riddles have been proved to have global market competitiveness.

2). Individual encryption/identification: Because of its multi-functional and easy-to-use characteristics, this invention provides a basis for individual users to set their own coding modes. A mode for individual coding solution is thereby created. This solution is essentially different from the encryption techniques of electronic data existing so far in that, the user may visually or physically explain the exchange of codes.

This invention can also be used as a kind of identification tool. According to the 'gravity' rule of the 'Crypto-Grid', all the 'cubic block(s)' representing the numbers 0, 1 or 2 can be orderly arranged in a single line. Such a feature can be made into a physical coding tool like a versatile key or a key responsive only to each of the individuals in the world.

3). Data input device: This invention is applicable to a kind of miniature keyboard which is handy and convenient for portable or hand-held equipments.

DESCRIPTION OF FIGURES

In the following, specific embodiments in combination with the drawings are enumerated to explain the ways by which the present invention is to be carried out:

FIG. 1 shows a front view of the coding tool for western characters of the present invention;

FIG. 2 shows a view for the coding of the word 'CRYPTO' of the present invention;

FIG. 3 shows a view of physical embodiment of the character games tool of the present invention;

FIG. 4 shows a view of electronic embodiment of the character games tool of the present invention;

FIG. 5 shows the surface and three-dimensional as well as the front, top and side views of the miniature keyboard of the present invention;

FIG. 6 shows the motion of the miniature keyboard of the present invention;

FIG. 7 shows the application of palm type, i.e., embodiment 1, of the miniature keyboard of the present invention;

FIG. 8 shows the status of flat type, i.e., embodiment 2, being built in small portable electronic equipment as well as its front and side views of the miniature keyboard of the present invention;

FIG. 9 shows the front, side and top views of telegraph type, i.e., embodiment 3, of the miniature keyboard of the present invention;

FIG. 10 shows the front, side and top views of piano type, i.e., embodiment 4, of the miniature keyboard of the present invention.

DETAILED DESCRIPTION EMBODIMENTS

As shown in FIG. 1, the coding tool for western characters of the present invention is consisted of at least six standardized cubic blocks 1 and at least three independent rectangular poles 2; the three rectangular poles 2 separated by a certain distance in respect to each other can stand upright and be movable on base 4; on the standardized cubic blocks 1, there is a rectangular through hole 3, whose sectional area is slightly bigger than those of the rectangular poles 2 to allow the cubic blocks 1 being put through on the rectangular poles 2 by way of the through hole 3; and the height of the rectangular poles 2 at least equals to the height of two cubic blocks 1, the number(s) of the standardized cubic blocks being put through on each of the rectangular poles 2 are the number(s) of the Crypto-Grid. Said cubic blocks 1 can be moved out of the rectangular poles 2 to facilitate the representation of the codes for different English letters. It is shown in FIG. 1 the codes for the 26 letters from A to Z and the code for null and space.

As shown in FIG. 2, the western word 'CRYPTO' is indicated on base 4 by the coding tool for western characters.

FIG. 3 shows a view of physical embodiment of the coding method for western characters of the present invention fashioned into a character games tool; structurally similar to the coding tool shown in FIG. 1, by putting the cubic blocks 1 through on the rectangular poles 2 and changing the numbers of the cubic blocks 1 on each of the rectangular poles 2 from 0 to 2, one after another of the letters and words can be represented according to the coding rule elucidated in FIG. 1.

As shown in FIG. 4, by virtue of computer software, the character games of the present invention can be carried out on computers; on monitor 1 of a computer, it may be visually seen that such character games are being carried out.

As shown in FIG. 5, a keyboard 11 of the present invention is consisted of three keys 1, and three holes 3 are set up on coding base 2, the keyboard 11 is fit together with coding base 2 by inserting keys 1 into holes 3; each key of said keyboard 11 may be designated in three states {'0', '1', '2'}, by virtue of various combinations of the three states of said three keys 1 and according to the coding principle mentioned above, the input of western characters can be realized.

FIG. 6 shows the motion of the miniature keyboard of the present invention; when the states of the three keys are all in {222}, the data of 'null' is inputted; when the states of the three keys are, respectively, {210}, the data of the letter 'D' is inputted.

FIG. 7 shows the palm type, i.e., embodiment 1, of the miniature keyboard of the present invention; the miniature keyboard is manufactured into a palm type, with five keys on the board 4, wherein the three keys 1 in the middle are enter keys, while the other keys 2, 3 are function keys respectively. Such keyboards may be used as hand-held data input devices, with characteristics of being handy in dimensions and vivid in appearance.

FIG. 8 shows the status of flat-type keyboard, i.e., embodiment 2, being built in small portable electronic equipment, cell phone, as well as the front and side views of the miniature keyboard of the present invention;

FIG. 9 shows the front, side and top views of telegraph type, i.e., embodiment 3, of the miniature keyboard of the present invention;

FIG. 10 shows the front, side and top views of piano type, i.e., embodiment 4, of the miniature keyboard of the present invention.

In view of the above, the miniature keyboard of the present invention that inputs data using only three keys has incomparable advantages over traditional, large keyboards, and it can be manufactured into palm, flat, piano, telegraph types and the like, well adapted to data input for various small electronic equipments. The character games tool of the present invention possesses the advantage of facilitating kids and their parents to study and entertain together. Furthermore, before the application of the present invention, there has been no disclosure of similar inventions. Therefore, the invention is in conformity with the requirement of the patent law. Your Respected Examiner is hereby asked to carry out a detailed examination. It is highly appreciated if the invention is granted early.

What is claimed is:

1. A games tool for western alphabet comprising at least six movable standardized cubic blocks, at least three movable rectangular poles independent of each other and at least one base; the three rectangular poles being placed on the base and separated by a certain distance with respect to each other; a rectangular through hole being provided on the standardized cubic blocks, wherein sectional area of the through hole is slightly larger than those of the rectangular poles, and the height of the rectangular poles being at least equal to the height of two cubic blocks; the number(s) of the standardized cubic blocks being put through on each of the rectangular poles being the numbers of the Crypto-Grid, whereby every letter in the western alphabet is assigned a 3-digit number that has specific value, the 3-digit number corresponding to a letter is the code of this letter, which is composed of three numbers, namely, 0, 1 and 2; and the total of corresponding modes for this 3-digit code specifically corresponds to a given letter in the alphabet is the factorial of 26, which is $26 \times 25 \times \ldots \times 1 = 4 \times 10_{26}$.

2. The games tool according to claim 1, wherein at least one group of the codes of the 26 letters from A to Z is as follows:

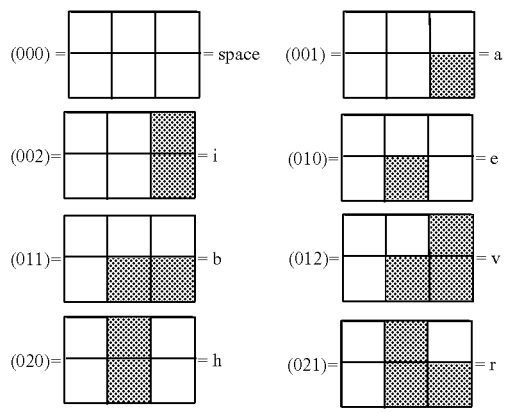

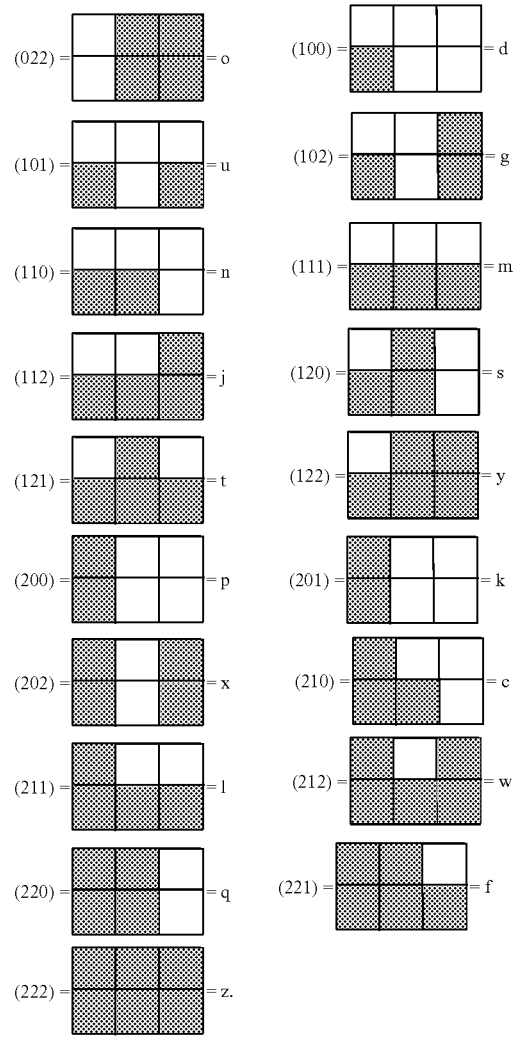

3. A miniature keyboard comprising three keys 1 and a coding base 2 on which three holes 3 being set up, keyboard 11 being fit together with the coding base 2 by keys 1 being inserted into holes 3; each key of said keyboard 11 being designated in three states {'0', '1', '2'}, whereby every letter in western alphabet is assigned a 3-digit number that has specific value, the 3-digit number corresponding to a letter is the code of this letter, which is composed of three numbers, namely, 0, 1 and 2; and the total of corresponding modes for this 3-digit code specifically corresponds to a given letter in the alphabet is the factorial of 26, which is $26 \times 25 \times \ldots \times 1 = 4 \times 10^{26}$.

4. The miniature keyboard of claim 3, wherein the structural shape of the keyboard is of a palm type.

5. The miniature keyboard of claim 3, wherein the structural shape of the keyboard is of a flat type that can be built in small portable electronic equipments.

6. The miniature keyboard of claim 3, wherein the structural shape of the keyboard is of a telegraph type.

7. The miniature keyboard of claim 3, wherein the structural shape of the keyboard is of a piano type.

8. The miniature keyboard according to claim 3, wherein at least one group of the codes of the 26 letters from A to Z is as follows:
(000) =  = space   (100) =  = d
(200) =  = p   (001) = 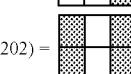 = a
(101) = 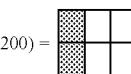 = u   (201) =  = k
(002) =  = i   (102) = 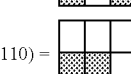 = g
(202) = 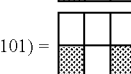 = x   (010) =  = e
(110) =  = n   (210) = 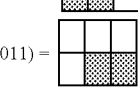 = c
(011) = 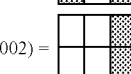 = b   (111) =  = m
(211) = 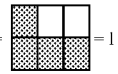 = l   (012) =  = v
(112) = 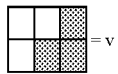 = j   (212) = 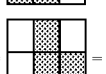 = w
(020) = 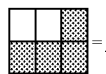 = h   (120) =  = s
(220) = 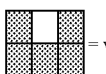 = q   (021) = 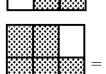 = r
(121) = 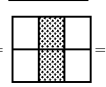 = t   (221) =  = f
(022) = 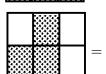 = o   (122) = 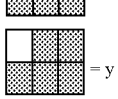 = y
(222) =  = z.
* * * * *